Patented Oct. 21, 1952

2,614,912

UNITED STATES PATENT OFFICE 2,614,912

PROCESS FOR MAKING COLORED ALUMINUM

Cyril M. Rice, Montreal, Quebec, Canada, assignor to Sinclair & Valentine Company, New York, N. Y., a corporation of New York No Drawing. Application October 7, 1950, Serial No. 189,057. In Canada April 19, 1946.

3 Claims. (Cl. 41—41)

This invention relates to colored and decorated aluminum products and to a process of making the same and the primary object of the invention is to provide colored aluminum products in which the multicolor decoration is highly resistant to, or protected from, removal or change by the action of abrasion, weather, light and a wide variety of substances with which the colored articles may come in contact in the course of their ordinary use, and in which non-colored parts are protected against discoloration or staining or weathering and the action of substances with which the articles may come in contact in the course of their use. A concomitant object is to provide a process of so coloring aluminum that the colors are caused to penetrate into the aluminum articles, whereby the colors are protected and of so treating uncolored portions that they are protected, all as aforesaid. A further object is to so control the coloring of aluminum that part of an article may be colored as desired, and part remain uncolored, or adjoining parts may be differently colored, whereby decorative designs, reading matter and the like may be displayed by contrast of sharply defined, variously colored and uncolored portions of the articles or by sharply defined portions of different colors. Another object is to provide a process of coloring aluminum which is simple, inexpensive and easily carried out on a commercial scale. Various other objects and the advantages of the invention may be ascertained from the following description.

The invention consists, broadly speaking, as to process, in anodizing aluminum; applying to parts of the anodized aluminum, as by printing, stencilling or in any other suitable way, one or more inks containing soluble coloring matter acceptable to the anodized aluminum, or a non-coloring protective matter acceptable to the anodized aluminum; removing the vehicle of the coloring or non-coloring matters with fixation of the coloring or non-coloring matters in the anodized surface of the aluminum; and consists as to product in anodized aluminum articles having variously coloring matters fixed in parts of the surface portion thereof with or without non-coloring matter fixed in other parts of the surface thereof.

In greater detail, the invention consists in the features and combinations of features herein disclosed, together with all such modifications thereof and substitutions of equivalents therefor as are within the scope of the appended claims.

In practising the invention, the coloring matters and the non-coloring matters used are those organic dyes which are soluble in a suitable solvent, such as water, alcohol or oil, and are acceptable to the anodized aluminum, that is to say, which will penetrate the surface portion of the anodized aluminum, either by reaction therewith or by adsorption into the minute irregularities, crevices, pockets or the like of the surface portion. Among the suitable organic dyes or coloring matters are the direct dyestuffs, acidic dyestuffs, basic dyestuffs and mordant colors, including those dyes which are capable of forming lakes with the oxidized aluminum surface. The soluble coloring matters are preferably used in the form of inks and are dyes admixed with vehicles suitable thereto, and are such as go into solution in the liquid constituents of the film-forming vehicles. Ordinary oily printing inks are suitable vehicles for oil soluble dyes which are admixed therewith and go into solution in the oil, while alcohol soluble lacquers as used in the printing trade in place of ordinary inks are suitable vehicles for alcohol soluble dyes which are admixed therewith and go into solution in the liquid constituent of the lacquer.

The coloring matter and, if such is used, the non-coloring matter are applied in any suitable way to the anodized surface, as by letterpress or lithographic, printing, stencilling, spraying, dipping or otherwise, or by a combination of these methods. Care must be taken that the anodized surface of the aluminum is perfectly clean and has not been contaminated prior to application of the coloring or non-coloring matter, by contact with the operator's hands or anything which would leave a deposit capable of preventing the necessary intimate contact of the coloring or non-coloring matter with the anodized surface. After application of the coloring and the non-coloring matter, if the latter has been used, the surplus matter is removed, the article washed with hot water, allowed to dry, the ink is removed by a solvent and the decorated anodized aluminum is finally burnished.

The following examples of preferred modes of practising the invention are illustrative but are not limitative.

Example 1

An aluminum sheet is anodized and has an ornamental or textual design printed on the surface thereof with a lacquer base, ink containing alcohol soluble dye, the ink being soluble in ethyl alcohol, Carbitol or other lacquer solvent. After standing for 5 to 60 minutes for the color to be adsorbed into the surface, and for the ink to dry, a second design in another color is printed on the surface, using a similar ink, and where the two designs are to be contiguous, the second impression is allowed to overlap the first impression. The sheet is then washed with lacquer solvent, is sealed by immersion for 5 to 30 minutes in boiling water and is then burnished. The printed design appears in bright or true colors against the bright anodized metal surface. If the sheet is again washed with solvent, the solvent remains clear, showing that the dye is held in the anodized surface. Measurement of the sheet thickness in the dyed portion shows no increase over the thickness of the sheet before printing. By grinding the dyed surface, it has been ascertained that the color penetration is of the order of 5/1000 of an inch.

*Example 2*

An anodized aluminum sheet has printed thereon a design using a water soluble ink containing water soluble basic Victoria Blue B. A second imprint is made using an ink containing water soluble basic Victoria Blue B to cover portions of the sheet up to the first imprint and to overlap same to the extent of a few thousandths of an inch all around so as to avoid any bare metal showing between the imprints. Such inks may be made with a zein base dissolved in water and Carbitol or other suitable solvents. After standing for the colors to set, the sheet is treated as in Example 1 and finally exhibits the design in red against a blue background. With proper selection of viscosities of the two inks, as is well understood in the printing trade, there is no bleeding of the red dye into the blue dye, or vice versa, and as the first ink has been dried before the second is printed, the vehicle of the first ink forms a substantial barrier to penetration of the second dye through the first impression onto the aluminum surface.

*Example 3*

An anodized aluminum sheet is imprinted with a design in accordance with the steps of Example 2 but using alcohol-soluble dyes and inks, or dyes and inks which are soluble in oil. Thereafter, imprinted portions of the aluminum surface are again printed in a design using a transparent, colorless resist material such as hard asphaltum varnish. After a time allowance for partial drying of the varnish, the sheet is dipped in a hot or warm solution of the desired color of dye in a suitable solvent. Using water soluble dyes in 5 to 20% concentration at about 160° F., from 5 to 10 minutes immersion is required. However, the more dilute the dye, or the lower the temperature, the longer may be required to produce the desired depth of color. The sheet is then washed with a solvent such as mineral spirit, until every trace of dye disappears from the portions which were printed with hard asphaltum varnish and the varnish itself is completely removed by means of the solvent, after which the ink impressions are removed by means of a separate solvent, such as alcohol. The sheet is then treated with boiling water, dried and burnished. The design which was printed in varnish appears as bright metal against a variously colored background. The bright metal will not subsequently accept coloring matter presented to it in the manner already described. If such is applied, it washes off with any solvent, showing that the anodized surface has been saturated with the non-coloring varnish and has sealed by the boiling water treatment. Preferably in this modification the dye bath, forming the final coloring step is made with a solvent which does not attack or dissolve the ink impressions or the colorless resist. Thus, if alcohol soluble inks are used and if oil soluble asphalt is used as the uncolored resist, the dye bath may be an aqueous solution.

I prefer to print the various dye-containing ink impressions by silk-screen stenciling, due to the relatively heavier layer of ink, and therefore the greater quantity of dye, which can be deposited on the anodized layer, making for greater brilliance and more intense color in the design.

In general, I also prefer to use acid dyes and to use them in alcohol or water solution as these dyes give better penetration into the anodized aluminum surface than the basic and other dyes, and these dyes in general have greater fastness to light than the oil-soluble dyes.

The inks useful in the process of the present invention comprise the appropriate dye dissolved with a suitable film-forming vehicle in a solvent. Such inks usually comprise:

Vehicle solids _____ per cent__ 10 to 20
Plasticizers _____ do____ 5 to 10
Dye _____ do____ 2 to 15
    (or to make saturated solution)
Solvent _____ Balance The ink base, considered as vehicle solids, may be chosen from the conventional ink vehicle solids, such as ethyl cellulose, vinyl chloride, cellulose nitrate, zein, or oily ink varnishes, and the solvent is chosen appropriately to the base of the ink vehicle. Thus, zein may be dissolved in the usual mixture of water and Carbitol, while the nitrocellulose may be dissolved in its usual solvents, and the oily ink varnishes are thinned by the use of mineral spirits.

The variety of dyes which may be used is almost unlimited and among the many which are suitable are the alcohol soluble, basic dyes, such as Orasol Scarlet B B, Orocine Scarlet M O O, and water soluble acid dyes such as Fast Acid Black REX, Neolan Green B. L. Concentrate as well as the water soluble basic dyes such as Alizarin Blue Black B, Victoria Blue B, and the oil soluble dyes such as Oil Blue B N and Oil Red E D.

The finish and appearance of aluminum products made as aforesaid is extremely durable. The color in the colored portions does not fade even after long weathering and exposure to light and is highly resistant to the action of dilute acids and alkalies and to hydrocarbon solvents, alcohols, ethers, chloroform and the like. Uncolored portions of the anodized surface which have been treated with a liquid paraffin, olefin or aromatic hydrocarbon are highly resistant to weathering and to staining and the surface remains smooth and bright and does not accept oil soluble or alcohol soluble colors to any material extent. Flat sheets decorated as aforesaid may be formed by bending, die stamping or similar mechanical processes without damaging the surface finish or any design or text printed thereon in the manner described.

This application is a continuation-in-part of my copending application Serial No. 674,388 filed June 4, 1946.

The invention in its broader aspects is not limited to the specific process and steps shown and described but departures may be made therefrom within the scope of the accompanying claims without departing from the principles of the invention and without sacrificing its chief advantages.

What is claimed is:

1. The method of decorating anodized aluminum sheet material which comprises printing on the anodized surface of the aluminum a design in an ink comprising a dye dissolved in a film-forming ink vehicle, dyeing the unprinted portions of the surface by immersing the surface in a dye solution which does not dissolve the ink vehicle, sealing the surface by treatment with boiling water and dissolving away the remaining ink vehicle.

2. The method of decorating anodized aluminum sheet material which comprises printing on the anodized surface of the aluminum a design in an ink comprising a dye dissolved in a film-forming ink vehicle, printing a second design in a differently colored similar ink after the first design has dried, portions of the second design overlapping portions of the first design, sealing the surface by treatment with boiling water and dissolving away the remaining ink vehicles.

3. The method of decorating anodized aluminum sheet material which comprises printing on the anodized surface of the aluminum a design in an ink comprising a dye dissolved in a film-forming ink vehicle, printing a second design in a differently colored similar ink after the first design has dried, portions of the second design overlapping portions of the first design, printing a design on other portions of the surface with an undyed resist, dyeing the remaining portions of the surface by immersion of the surface in a dye dissolved in a solvent which is not a solvent for either of the previous printed ink impressions, sealing the surface by treatment with boiling water and dissolving away the remaining ink vehicle.

CYRIL M. RICE.

REFERENCES CITED

The following references are of record in the file of this patent:

UNITED STATES PATENTS

| Number | Name | Date |
|---|---|---|
| 2,150,409 | Yasoshima | Mar. 14, 1939 |